United States Patent [19]
Beck

[11] Patent Number: 5,988,607
[45] Date of Patent: Nov. 23, 1999

[54] SELF-PUMPING HYDROPNEUMATIC STRUT WITH AN INTERNAL LEVEL CONTROL

[75] Inventor: Hubert Beck, Eitorf, Germany

[73] Assignee: Fichtel & Sachs AG, Eitorf, Germany

[21] Appl. No.: 08/863,809

[22] Filed: May 27, 1997

[30] Foreign Application Priority Data

May 28, 1996 [DE] Germany .............................. 196 21 374
Sep. 4, 1996 [DE] Germany .............................. 196 35 880

[51] Int. Cl.⁶ .............................. F16F 5/00; B60G 13/00; B60G 7/00
[52] U.S. Cl. .................. 267/64.26; 267/218; 280/5.514; 280/124.161; 280/DIG. 1
[58] Field of Search ................................. 267/218, 64.16, 267/64.26, 64.17; 280/DIG. 1, 5.514, 124.16, 124.161

[56] References Cited

U.S. PATENT DOCUMENTS

| | | | |
|---|---|---|---|
| 3,087,743 | 4/1963 | Behles ................................ | 280/DIG. 1 |
| 3,951,392 | 4/1976 | De La Faille ........................... | 267/218 |
| 4,502,672 | 3/1985 | Meller et al. ......................... | 267/64.17 |
| 4,883,150 | 11/1989 | Arai .................................. | 280/DIG. 1 |
| 5,009,400 | 4/1991 | Ott ................................... | 267/64.26 |
| 5,062,616 | 11/1991 | Sommer ............................... | 267/64.17 |

FOREIGN PATENT DOCUMENTS

| | | | |
|---|---|---|---|
| 3840790 | 2/1990 | Germany . | |
| 3914385 | 10/1990 | Germany . | |
| 1035509 | 7/1966 | United Kingdom ................ | 267/64.17 |

*Primary Examiner*—Robert J. Oberleitner
*Assistant Examiner*—Jeffrey Woller
*Attorney, Agent, or Firm*—Nils H. Ljungman & Associates

[57] ABSTRACT

A self-pumping hydropneumatic strut with an internal level control, especially for automobiles, has a power cylinder. The power cylinder is under the pressure of at least one gas pad acting as a spring. The gas pad is placed in a high-pressure chamber, which high-pressure chamber is filled with damping agents. The power cylinder is divided into two working chambers by a working piston. The working piston is carried by a hollow piston rod and is equipped with valves. A piston pump is driven by the spring motion and transports oil from a low-pressure chamber into the working chamber. The working chamber is connected to the high-pressure chamber. The piston pump includes a pump chamber formed by the hollow piston rod and a pump rod that is connected to the power cylinder. The damping agent in the pump chamber can be pressure-impacted by a driving element.

20 Claims, 7 Drawing Sheets

SELF-PUMPING HYDROPNEUMATIC STRUT WITH AN INTERNAL LEVEL CONTROL

BACKGROUND OF THE INVENTION

1. Field of the Invention:

The present invention relates generally to a self-pumping hydropneumatic strut with an internal level control, especially for automobiles. The self-pumping hydropneumatic strut has a power cylinder which is under the pressure of at least one gas pad acting as a spring. The gas pad is placed in a high-pressure chamber, which high-pressure chamber is filled with damping agents. The power cylinder is divided into two working chambers by a working piston. The working piston is carried by a hollow piston rod and is equipped with valves. A piston pump is driven by the spring motion and transports oil from a low-pressure chamber into the working chamber that is connected to the high-pressure chamber. The piston pump includes a pump chamber formed by the hollow piston rod and a pump rod that is connected to the power cylinder.

2. Background Information:

Self-pumping hydropneumatic struts are already known (e.g., German Patent No. 38 40 790 and German Patent No. 39 14 385, which corresponds to U.S. Pat. No. 5,062,616), where, by means of the piston pump of the strut, while the vehicle is in motion, damping agents are pumped into the power cylinder until the level position of the vehicle is reached. After reaching the level position, the power cylinder disengages a downward-control opening so that, with the aid of a short circuit or bypass, further upward-control of the vehicle's built-up can be avoided. In order to reach the level position while the vehicle is charging, immediately after starting the vehicle, it is possible, while the vehicle is not in motion, to transport oil into the working chamber by means of a pressurized accumulator. In contrast to the high-pressure chamber and the low-pressure chamber, the pressurized accumulator is impacted with higher pressure so that, when the vehicle is charging, the piston rod, in the standing position, dives into the strut, and thus a bypass system between the pressurized accumulator and the high-pressure chamber is opened. As a rule, the volume of the pressurized accumulator is sufficient for a one-time actuation so that during the next trip, by means of the piston pump, charging of the pressurized accumulator must once again take place.

OBJECT OF THE INVENTION

The object of the present invention is to further develop a strut with an internal level control so that, with a vehicle that is not in motion, an upward-control to the level position of the vehicle's built-up is easily possible.

SUMMARY OF THE INVENTION

The present invention teaches that this object can be accomplished in accordance with at least one possible embodiment by an arrangement in which the damping agent in the pump chamber can be pressure-impacted by a driving element.

The present invention has the advantage that the pressure can be increased in the pump chamber, by means of the driving element, so that, by opening the respective valves, an equalization of pressure between the pump chamber and the working chamber takes place. The working chamber can preferably be connected to the high-pressure chamber. At the same time, without the feeding of oil, fluid, or damping agents, an upward-control of the vehicle's built-up is achieved in the standing position.

In other words, the driving element can be used to increase the pressure of the damping agents in the pump chamber. The damping agents can then be transported into an upper working chamber through an outlet valve in the piston. The upper working chamber, upon receiving the pressurized damping agents from the pump chamber, can be pressurized to equal the pressure in the pump chamber. The upper working chamber can preferably have a connection to the high-pressure chamber and can transport the pressurized fluid to the high-pressure chamber. By increasing the pressure in the high-pressure chamber, the elevation of the vehicle or vehicle's built-up can be raised before the vehicle begins to move. The use of the damping agents in the pump chamber to adjust the elevation of the vehicle can remove the need for an external source of damping agents or fluid to raise the vehicle.

According to another embodiment, it is planned that the driving element can be placed inside the strut or that the driving element can be placed outside the strut. The driving element can be connected, by means of a flow connection, to the pump chamber.

A favorable embodiment intends that as the driving element, a piston-cylinder unit is utilized, whereby, by means of the piston, a fluid is compressible. Another embodiment intends that the piston of the piston-cylinder unit is driven by an eccentric.

Moreover, it is planned that as the driving element, pressure-generating units are utilized which deviate from a means of drive such as the piston-cylinder unit.

In other words, the driving element can be realized as a piston-cylinder unit or as pressure-generating unit different from a piston-cylinder unit. When a piston-cylinder unit is utilized, the piston of the piston-cylinder unit can be used to compress a fluid.

Pursuant to another embodiment, the damping agent is directly impacted by the driving element or is designed in such a way that the fluid is separated from the damping agent by a parting element. The latter embodiment ensures the opportunity of an easy add-on, in that, by providing the appropriate ports, the connections and the chambers which carry damping agents are self-contained while, by means of an analogous feasible connection, a corresponding driving element can be added on.

In other words, the drive element can directly impact the damping agent or the drive element can directly impact an additional fluid which fluid then can impact the damping agent. The additional fluid and the damping agent can be separated from each other by a parting element. The impacting of the damping agent through an additional fluid can allow a relatively easy addition or change of the drive element. The easy addition of the drive element can be ensured by having a substantially standardized connecting arrangement to permit easy hook-up of new elements to existing elements.

To achieve a corresponding separation between fluid and damping agent, parting elements are provided. The parting elements, depending on the embodiment, can be designed as diaphragms, parting pistons, or step pistons.

In each case, the parting elements are favorably placed, production engineering-wise, in the area of the piston rod.

According to another embodiment, it is planned that the driving element, an actuator, be integrated in the piston rod or be placed in the power cylinder. The actuator can be, by means of a connection in the pump rod, connected to the pump chamber.

Pursuant to another feature, it is planned that the driving element impacts an inlet and outlet valve of a mechanical pump, formed by the pump rod and the pump chamber.

To create a complete system in a vehicle, it is planned that at least two struts interconnect to form one system. It is advantageous that the pump chambers of at least two struts are pressure-impacted by a driving element.

Further, it is planned that in the piston-cylinder unit a number of pistons, that correspond with the connected struts, can be driven by an eccentric.

To achieve an equalization of pressure between the ducts and the eccentric chamber, it is planned that the driving shaft of the eccentric can be sealed vis-a-vis the atmosphere by means of a seal.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein.

DESCRIPTION OF THE PREFERRED EMBODIMENT

Figure 1:
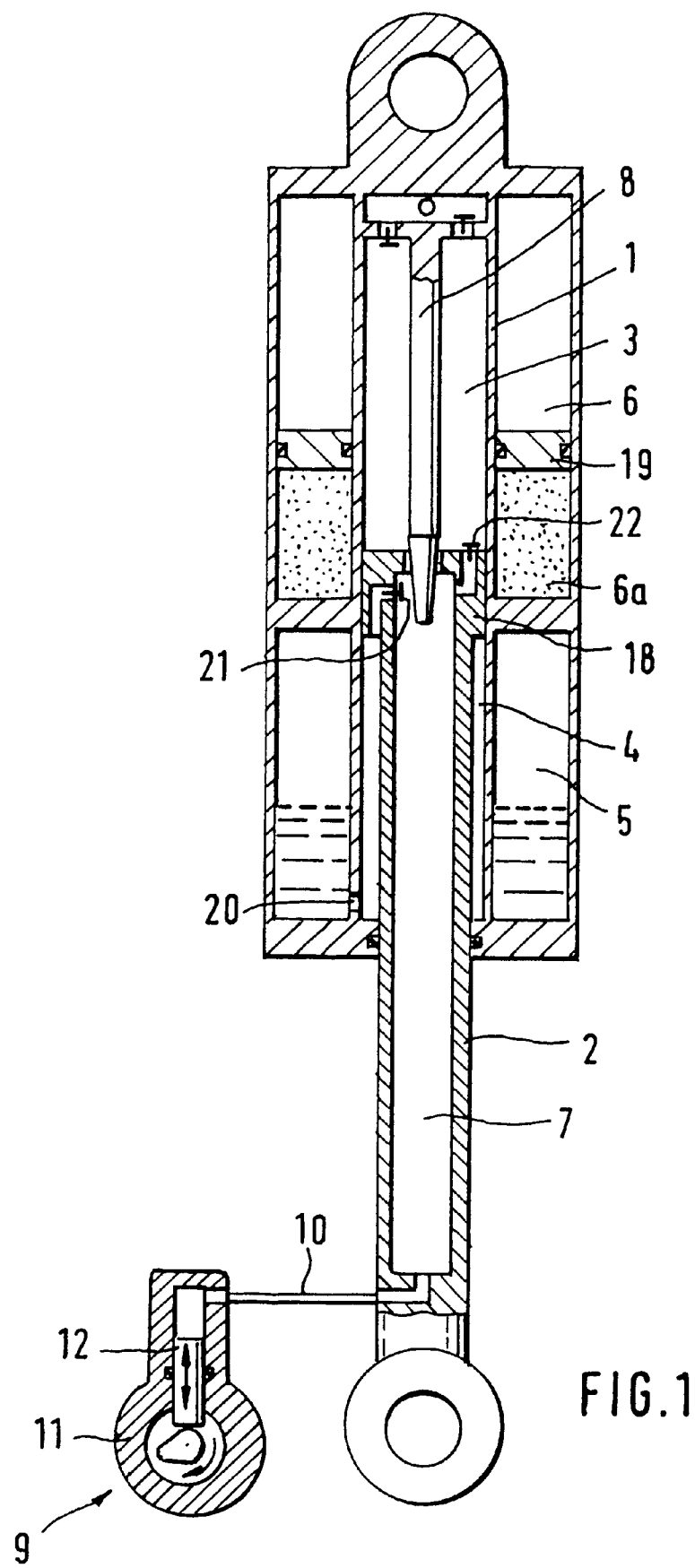
FIG. 1 shows a strut with an internal level control, in a sectional view.

The strut with an internal level control for automobiles, illustrated in FIG. 1, can include essentially the power or work cylinder 1 of the strut. In the power or work cylinder 1, a working piston 18 can slide at the end of a piston rod 2. The power or work cylinder 1 can be closed on one side by a bottom 106 (see FIG. 1A) and can be closed on the other side by a top 105 (see FIG. 1A) through which the piston rod 2 can proceed to the outside in a sealed manner. The bottom 106 and the piston rod 2 are preferably fastened, in a way not illustrated here, to the body of the vehicle or to the axle of the vehicle by means of a fastening device. The power or work cylinder 1 is preferably surrounded by a ring-shaped equalizing chamber which is filled partially with oil and partially with gas. The equalizing chamber can be, through a partition wall, subdivided into a high-pressure chamber 6 and a low-pressure chamber 5. The high-pressure chamber 6 can be, through an annular parting piston 19, subdivided into a section 6b (see FIG. 1A) filled with a damping agent and a section 6a filled with gas.

In an entirely downward-controlled, i.e., in a not pumped-up state, the low-pressure chamber 5 and the high-pressure chamber 6 preferably have the same pressure. The low-pressure chamber 5 can be connected to the high-pressure chamber 6 by means of a recess 20, a lower working chamber 4, an inlet valve 21, a pump chamber 7, an outlet valve 22, and an upper working chamber 3. At the bottom of the power cylinder 1, a pump rod 8 can be fastened. The pump rod 8 can form, together with the pump chamber 7 of the hollow piston rod 2, a piston pump. During the telescopic-like motion of the piston rod 2 vis-a-vis the power or work cylinder 1, the pump rod 8 dives into the pump chamber 7 so that, in the pulling stage, damping agents flow from the low-pressure chamber 5, by means of the recess 20, past the inlet valve 21, into the pump chamber 7. During the pushing stage, the inlet valve 21 closes and the damping agent from the pump chamber 7 advances, by means of the outlet valve 22, into the upper working chamber 3, and thus preloads the high-pressure chamber 6.

Figure 1A:
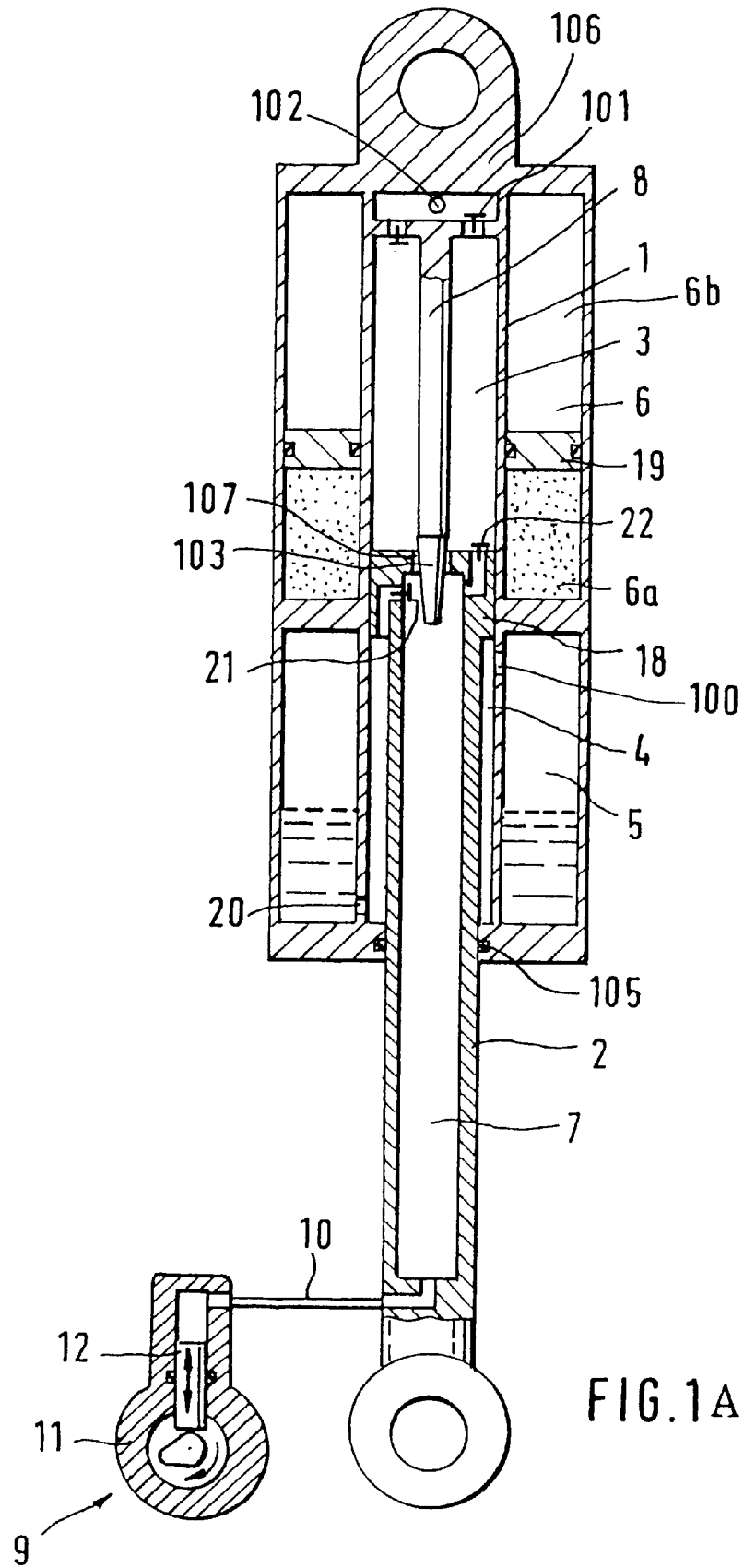
FIG. 1A shows the strut of FIG. 1 with additional features.

In one possible embodiment of the present invention, as illustrated in FIG. 1A, when the vehicle is in motion, the shock-absorbing strut can function as follows. As the vehicle is traveling along the surface driven upon, defects in the surface can cause the vehicle to move up and down in response to the defects. The up and down movement of the vehicle can cause the pump rod 8 to move in and out of the pump chamber 7. The movement of the pump rod 8 in and out of the pump chamber 7 causes the damping agent in the low-pressure chamber 5 to be pumped into the upper working chamber 3. More specifically, when the pump rod 8 is inserted into the pump chamber 7, the damping medium in the pump chamber 7 can be transported through the outlet valve 22 into the upper working chamber 3. The damping medium can then be transported from the upper working chamber 3 via a valve arrangement 101 and an opening or boring 102 into the damping fluid filled section 6b of the high-pressure chamber 6. As damping fluid enters the damping fluid filled section 6b, the damping fluid filled section 6b can then compress the gas filled section 6a of the high-pressure chamber 6. When the pump rod 8 is withdrawn from the pump chamber 7, damping medium can be drawn into the pump chamber 7 from the low-pressure chamber 5. The damping medium can enter the pump chamber 7 through the inlet valve 21. Further, the damping medium can exit the low-pressure chamber 5 through a recess 20 and be transported through the lower working chamber 4 to the inlet valve 21.

In accordance with one embodiment, as the pumping action of the pump rod 8 in and out of the pump chamber 7 continues, the pressure in the high-pressure chamber 6 can preferably continue to build. However, as the vehicle begins to reach its level position, the pressure in the high-pressure chamber 6 should begin to level off. On reaching the level position of the vehicle, the pressure in the pump chamber 7 can be equalized to match the pressure in the high-pressure chamber 6. A conical area 103 of the pump rod 8 can be used to equalize the pressure between the pump chamber 7 and the high-pressure chamber 6. The conical area 103 can equalize the pressure between the high-pressure chamber 6 and the pump chamber 7 by preferably creating a flow passage for the damping agent between the chambers. The damping agent can flow between the upper working chamber 3 and the pump chamber 7 through a gap between the conical area 103 and an opening 107 in the piston 18 for the pump rod 8.

In accordance with one embodiment, upon reaching the level position of the vehicle, the movement of the piston 18 back and forth over the conical area 103 will preferably not cause a further building of pressure in the high-pressure chamber 6. However, a larger displacement of the piston 18 past the conical area 103 and back onto the pump rod 8 can preferably resume the building of pressure in the high-pressure chamber 6. The raising of the pressure in the high-pressure chamber 6 can then preferably raise the position of the vehicle when equalization occurs again between the high-pressure chamber 6 and the pump chamber 7. The position of the vehicle can continue to be raised by large displacements of the piston 18 until a maximum level position is reached.

In accordance with one embodiment, upon reaching the maximum level position, the piston 18 is preferably displaced beyond a return flow passage 100. The return flow passage 100 can permit the flow of damping agents between the upper working chamber 3 and the low-pressure chamber 5. The flow of damping agents between the upper working chamber 3 and the low-pressure chamber 5 can release some of the pressure in the high-pressure chamber 6. Upon the reduction of pressure in the high-pressure chamber 6, the position of the vehicle can preferably return to the level position. This process of building and relieving pressure can be repeated to preferably keep the position of the vehicle at the level position.

In another possible embodiment of the present invention, a return flow passage 100 can be used to allow a flow of damping medium from the upper work chamber 3 back to the low-pressure chamber 5. The return flow passage 100 can be used to achieve the level regulation for the shock absorbing strut. When the strut is in the compression stage, the return flow passage 100 can be blocked by the working piston 18 or can permit flow into the lower work chamber 4, depending on the location of the piston 18. When the strut is in the decompression stage, the piston 18 leaves the return passage 100 unblocked and in this stage allows return flow to the low-pressure chamber 5.

In still another possible embodiment of the present invention, the pressure built-up in the gas filled section 6a can be used to displace the piston 18 past the return flow passage 100. Once the piston 18 is past the return flow passage 100, the damping medium can then flow from the upper working chamber 3 to the low-pressure chamber 5 until the level position of the vehicle is once again reached. The pressure in the gas filled section 6a can be sufficient to displace the piston 18 past the return flow passage 100 even though the pump rod 8 and the pump chamber 7 are preferably not building pressure in the high-pressure chamber 6.

While the vehicle is at a standstill, i.e., the piston rod 2 does not move vis-a-vis the power or work cylinder 1, with the vehicle charging and with increasing the vehicle's weight, a decrease in the vehicle's built-up would result in the piston rod 2 diving slowly into the power cylinder 1. An increase in the vehicle's built-up in this state can only be achieved by an increase in pressure in the high-pressure chamber 6. At the same time, a driving element 9 is connected to this, which is designed as a piston-cylinder unit 11 in FIG. 1, and which is, by means of a flow connection 10, connected to the pump chamber 7.

A piston 12 of the piston-cylinder unit 11 constantly compresses and relaxes the damping agent in the pump chamber 7, whereby damping agents advance from the low-pressure chamber 5, by means of the recess 20 and the inlet valve 21, into the pump chamber 7, and from there they advance, by means of the outlet valve 22, into the upper working chamber 3. Since the high-pressure chamber 6 is connected to the upper working chamber 3, the gas in the gas filled section 6a of the high-pressure chamber 6 can be preloaded. Through the increase in pressure in the high-pressure chamber 6, the piston rod 2 travels outwards without an additional damping agent being foreign-fed.

Figure 2:
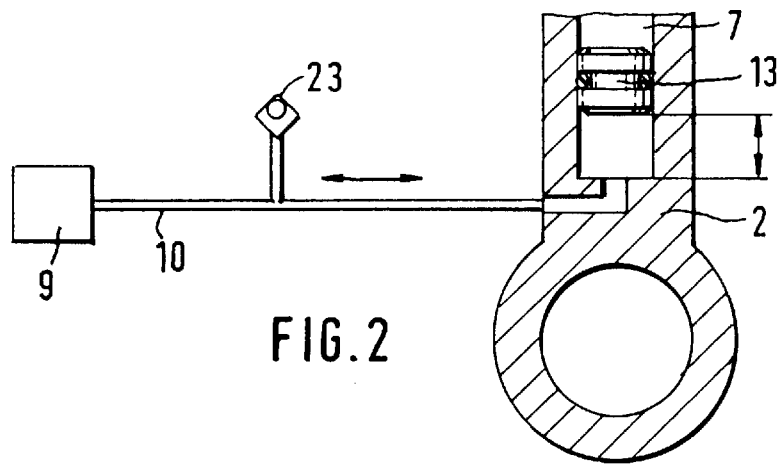
FIGS. 2 through 4 show in detail corresponding ports of the driving unit on the pump chamber.

In FIG. 2, a piston rod 2 together with the pump chamber 7 are illustrated in detail, whereby the driving element 9 possesses its own supply of fluid that can be separated, by means of a parting piston 13, from the damping agent of the strut.

Figure 3:
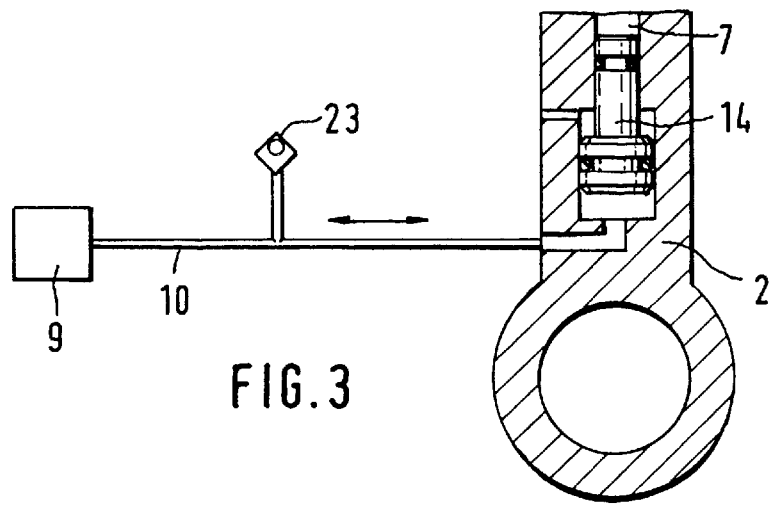
Figure 4:
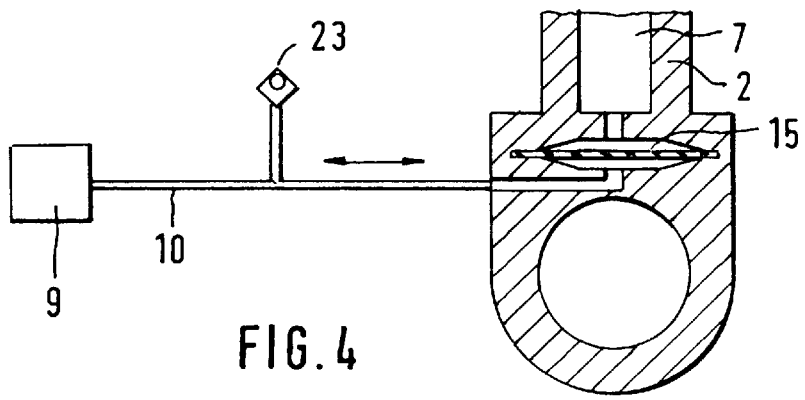

In FIG. 3, a step parting piston 14 is utilized for separating the fluid of the driving element 9 from damping agents, while in FIG. 4 the separation is realized by means of a diaphragm 15. The solutions pursuant to FIGS. 2 through 4 can be suitable for the subsequent installation of a so-called position control. The damping agent in the strut can force the parting piston 13, the step parting piston 14, or the diaphragm 15 to lie against the side opposite the pump chamber 7. Only after attaching the driving unit 9, by means of the flow connection 10, a pressure-impact or impinging of the parting piston 13, step parting piston 14, or diaphragm 15 can be possible. Subsequent installation of the driving unit 9, however, can require a filling and venting device 23.

Figure 5:
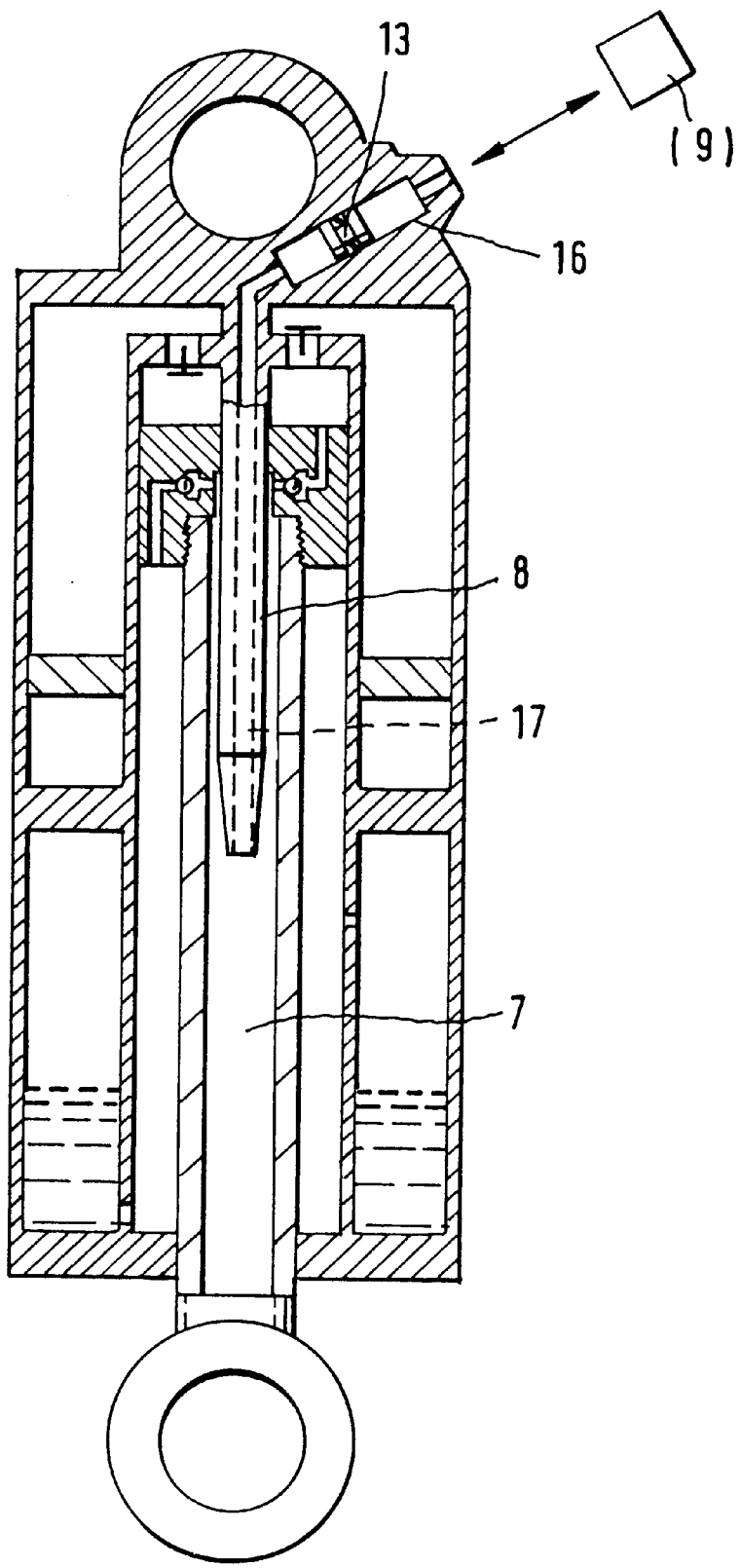
FIG. 5 shows a strut with an actuator integrated in the power cylinder.

From FIG. 5, a strut can be gathered where the driving element 9, in the form of an actuator 16, is placed in the casing of the strut. The parting piston 13 separates the fluid, driven by the driving element 9, from the damping agent of the strut. Impacting the damping agent in the pump chamber 7, by the actuator 16, is ensured by means of a connection 17 in the pump rod 8.

Figure 6:
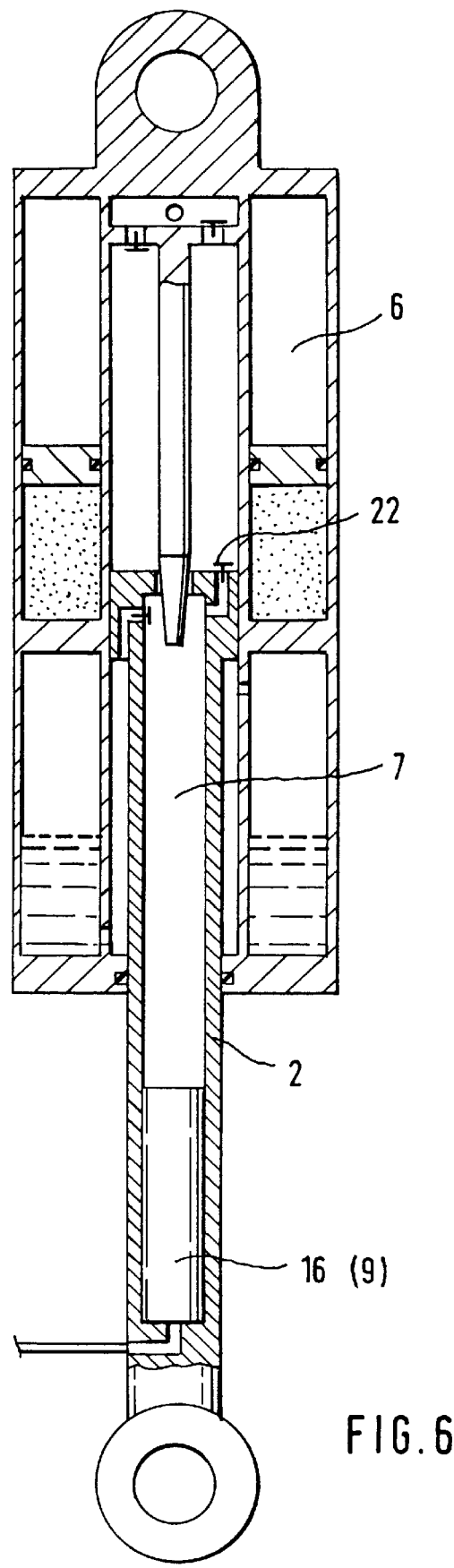
FIG. 6 shows a strut, in a sectional view, with an integrated actuator in the piston rod.

In FIG. 6, an actuator 16 can be integrated into the piston rod 2. The actuator 16 can be impacted electrically, pneumatically, or hydraulically. Also, the actuator 16 can compress the damping agent in the pump chamber 7 so that, by means of the outlet valve 22, a preload of the high-pressure chamber 6 can be ensured.

In other words and in accordance with one possible embodiment, the actuator 16 or drive element 9 can be positioned in the pump chamber 7 of the piston rod 2. The actuator 16 can be controlled electrically, pneumatically or hydraulically. The actuator 16 can be used when the vehicle is at a stand-still to preload the gas in the gas filled section 6a of the high-pressure chamber 6.

Figure 7:
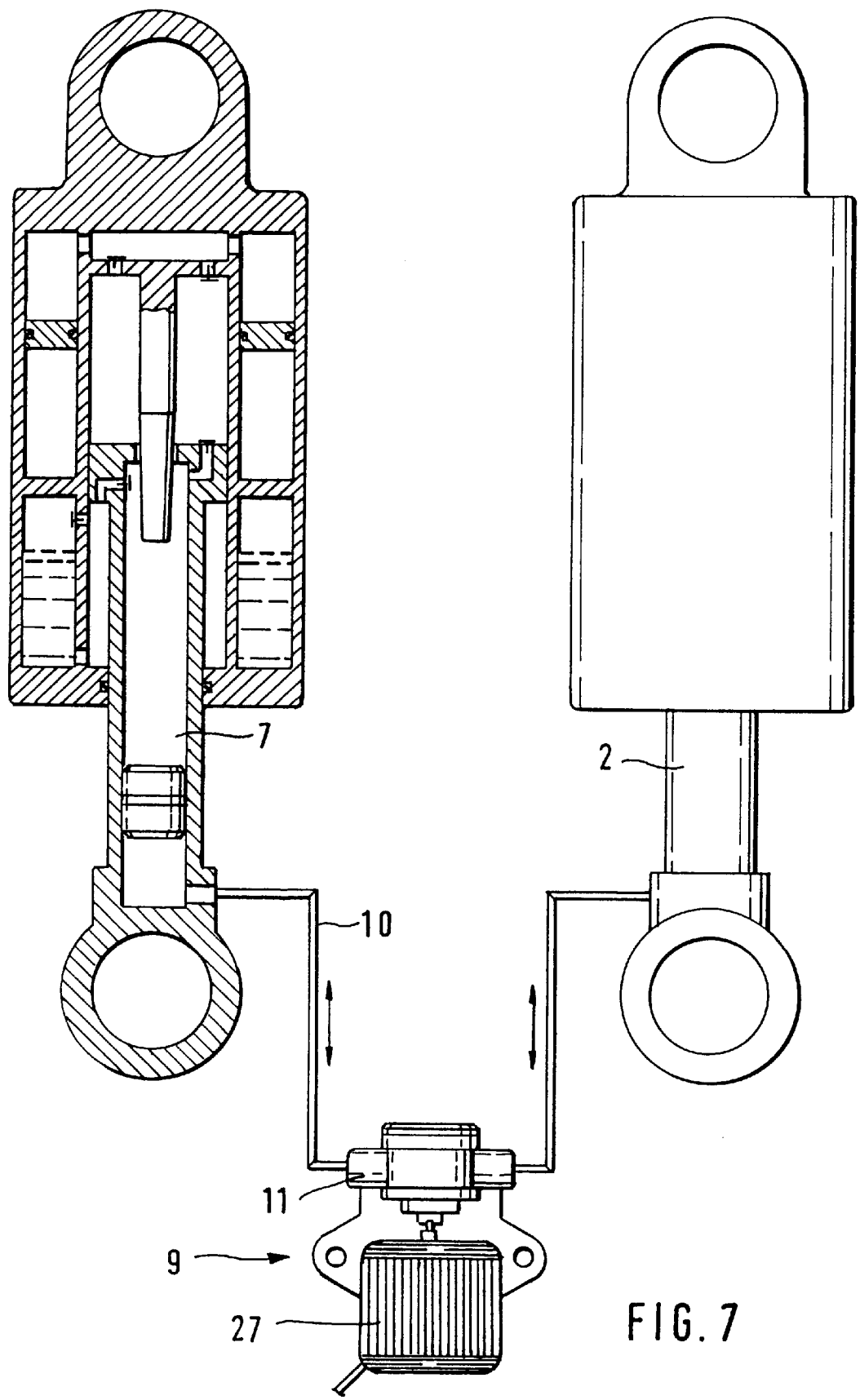
FIG. 7 shows two struts which are impacted by means of a shared driving unit.

In FIG. 7, two struts are illustrated that interconnect to form one system. In principle, the struts correspond with the embodiment pursuant to FIG. 1, whereby the driving element 9 is connected, each time by means of one flow connection 10, to the pump chamber 7 of the respective piston rod 2. In this embodiment, the driving element 9 includes the piston-cylinder unit 11 and an electric motor 27.

Figure 8:
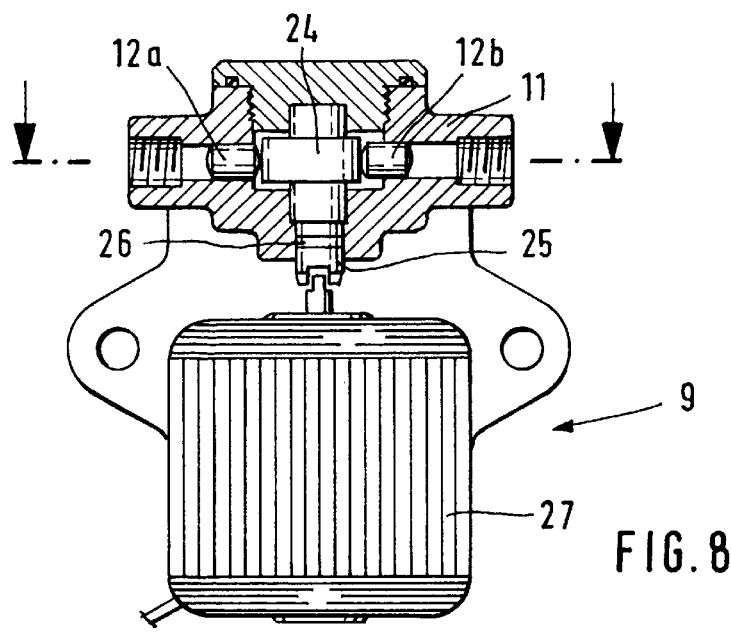
FIGS. 8 through 10 show a driving unit, in three views, partly in a sectional view.
Figure 9:
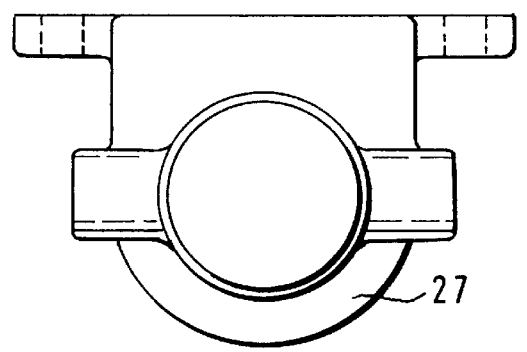
Figure 10:
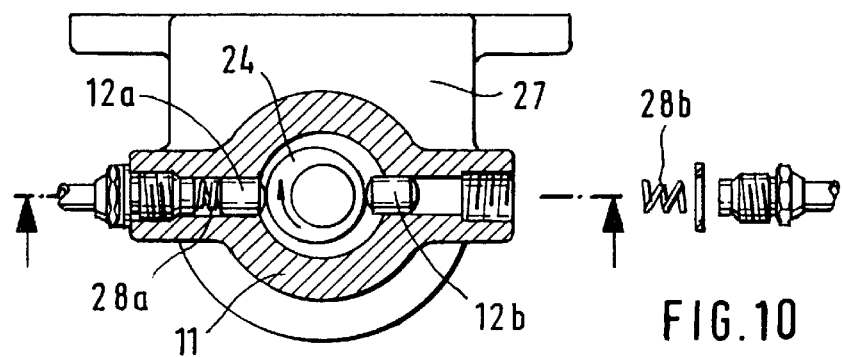

In FIGS. 8 through 10, the driving element 9, as illustrated in FIG. 7, is illustrated in three views, partly in a sectional view. The electric motor 27 can be connected, by means of a shaft, to a driving shaft 25 of the piston-cylinder unit 11. The driving shaft 25 preferably drives directly an eccentric 24 which impacts, according to its rotary motion, the pistons 12a and 12b in their respective cylinders. FIG. 10 shows that, if necessary, return springs 28a and 28b can be used for impacting the pistons 12a and 12b. Through the rotating eccentric 24, the pistons 12a and 12b are impacted in an opposed manner so that the volume of the fluid remains constant in the internal chamber of the eccentric 24. A sealing of the driving shaft 25 can be realized by a seal 26. In this way, the internal chamber of the eccentric 24 and the flow connections 10 will preferably have the same pressure. By avoiding seals on the pistons 12a and 12b, a drive low in friction can be created. A drive low in friction can require less power, thus, a smaller electric motor 27 will do. Since the eccentric 24 is placed in the eccentric chamber within the flow connection, the eccentric 24 is simultaneously lubricated and cooled by the fluid, and thus is subject to minor wear.

One feature of the invention resides broadly in the self-pumping hydropneumatic strut with an internal level control, especially for automobiles, with a power cylinder which is under the pressure of at least one gas pad acting as a spring, placed in a high-pressure chamber filled with damping agents, which power cylinder is divided into two working chambers by a working piston that is carried by a hollow piston rod and equipped with valves, with a piston pump that is driven by the spring motion and which transports oil from a low-pressure chamber into the working chamber that is connected to the high-pressure chamber, consisting of a pump chamber formed by the hollow piston rod and a pump rod that is connected to the power cylinder, distinguished in that the damping agent in the pump chamber 7 can be pressure-impacted by a driving element 9.

Another feature of the invention resides broadly in the strut distinguished in that the driving element 9 is placed inside the strut.

Yet another feature of the invention resides broadly in the strut distinguished in that the driving element 9 is placed outside the strut and is connected, by means of a flow connection 10, to the pump chamber 7.

Still another feature of the invention resides broadly in the strut distinguished in that as the driving element 9, a piston cylinder unit 11 is utilized, whereby, by means of the piston 12, a fluid is compressible.

A further feature of the invention resides broadly in the strut distinguished in that the piston 12 of the piston cylinder unit 11 is driven by an eccentric 24.

Another feature of the invention resides broadly in the strut distinguished in that as the driving element 9, pressure-generating units are utilized which deviate from a means of drive such as the piston cylinder, for example.

Yet another feature of the invention resides broadly in the strut distinguished in that the damping agent is directly impacted by the driving element 9.

Still another feature of the invention resides broadly in the strut distinguished in that the fluid is separated from the damping agent by a parting element.

A further feature of the invention resides broadly in the strut distinguished in that as the parting element, a diaphragm 15, a parting piston 13, a step piston 14, etc. are utilized.

Another feature of the invention resides broadly in the strut distinguished in that as the driving element 9, an actuator 16 is integrated in the piston rod 2.

Yet another feature of the invention resides broadly in the strut distinguished in that as the driving element 9, an actuator 16 is placed in the power cylinder 1 and is connected, by means of a connection 17 in the pump rod 8, to the pump chamber 7.

Still another feature of the invention resides broadly in the strut distinguished in that the driving element 9 impacts an inlet—and outlet valve 21,22 of a mechanical pump, formed by the pump rod 8 and the pump chamber 7.

A further feature of the invention resides broadly in the strut distinguished in that at least two struts are interconnected to form one system.

Another feature of the invention resides broadly in the strut distinguished in that the pump chambers 7 of at least two struts are pressure-impacted by a driving element 9.

Yet another feature of the invention resides broadly in the strut distinguished in that in the piston cylinder unit 11 a number of pistons 12a,12b, that correspond with the struts connected, are driven by an eccentric 24.

Still another feature of the invention resides broadly in the strut distinguished in that the driving shaft 25 as the eccentric 24 is sealed vis-a-vis the atmosphere by means of a seal 26.

Examples of hydropneumatic struts with internal level regulation, components of which may be used in conjunction with embodiments of the present invention, can be found in the following U.S. Pat. Nos. 5,062,616; 4,993,693; 4,577,840; and 4,502,672.

Examples of shock absorbing struts which may be used in conjunction with embodiments of the present invention, can be found in the following U.S. Pat. Nos. 5,551,541; 5,547, 050; 5,522,483; 5,480,129; 5,477,949; 5,467,851; 4,850, 460; 4,802,561; 4,785,920; and 4,650,042.

Examples of drive elements which may possibly be utilized or adapted for use in the context of the present invention may be disclosed in the following patents: U.S. Pat. No. 5,601,417, entitled "Hydraulic Pump with Ball Bearing Pistons"; U.S. Pat. No. 5,538,400, entitled "Variable Displacement Pump"; U.S. Pat. No. 5,529,466, entitled "Reciprocating Valved Piston Hydraulic Pump Assembly for Anti-Lock Braking System"; U.S. Pat. No. 5,493,861, entitled "Hydraulic System with Pump and Load"; U.S. Pat. No. 5,460,491, entitled "Displacement Pump as well as a Pump Assembly Comprising Two Displacement Pumps"; U.S. Pat. No. 5,409,354, entitled "Variable Displacement Pump"; U.S. Pat. No. 5,395,219, entitled "Hydraulic Pump Having Cam Driven, Spring Biased Piston"; U.S. Pat. No. 5,360,322, entitled "Hydraulic Pump Driven by an Electric Motor"; U.S. Pat. No. 5,295,737, entitled "Electric Motor-Driven Hydraulic Pump"; U.S. Pat. No. 5,096,394, entitled "Positive Displacement Pump with Rotating Reciprocating Piston and Improved Pulsation Dampening"; U.S. Pat. No. 4,921,409, entitled "High Pressure Reciprocating Pump"; U.S. Pat. No. 4,818,192, entitled "Reciprocating Pump"; U.S. Pat. No. 4,360,322, entitled "Positive Displacement Pump Systems"; and U.S. Pat. No. 4,021,164, entitled "Pump Having Reciprocating Pumping Means".

The following U.S. patent applications: Ser. No. 08/761, 358, entitled "Self-Pumping Hydropneumatic Shock Absorbing Strut with Internal Level Regulation", filed on Dec. 6, 1996, having inventor Hubert Beck; Ser. No. 08/769, 663, entitled "Self-Pumping Hydropneumatic Shock Absorbing Strut with Internal Level Regulation", filed on Dec. 19, 1996 having inventor Hubert Beck; Ser. No. 08/760,882, entitled "Self-Pumping Hydropneumatic Shock Absorbing Strut with Internal Level Regulation", filed on Dec. 6, 1996, having inventor Hubert Beck; and Ser. No. 08/772,180, entitled "Self-Pumping Hydropneumatic Shock Absorbing Strut with Internal Level Regulation", filed on Dec. 19, 1996, having inventor Hubert Beck are hereby incorporated by reference as if set forth in their entirety herein.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 196 21 374.6 filed on May 28, 1996 and Federal Republic of Germany Patent Application No. 196 35 880.9 filed on Sep. 4, 1996, having inventor Hubert Beck, and DE-OS 196 21 374.6, DE-OS 196 35 880.9, DE-PS 196 21 374.6 and DE-PS 196 35 880.9, as well as their published equivalents, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A self-pumping hydropneumatic shock absorbing strut with an internal level control for a motor vehicle, said shock absorbing strut comprising:

a cylinder;

said cylinder being configured to contain a hydraulic damping fluid;

said cylinder comprising a first end and a second end;

said first end of said cylinder being configured and disposed to operatively connect to a first part of a motor vehicle;

said second end of said cylinder being disposed opposite said first end of said cylinder;

a piston rod;

said piston rod sealingly projecting into said second end of said cylinder;

said piston rod comprising a first end and a second end;

said first end of said piston rod being configured and disposed to operatively connect to a second part of a motor vehicle;

said second end of said piston rod being disposed opposite said first end of said piston rod;

a piston;

said piston being disposed on said second end of said piston rod;

said piston being configured and disposed to slide within said cylinder;

a self-pumping and internally self-leveling arrangement being configured and disposed to move said piston to a position to self-level a motor vehicle attached to said self-pumping hydropneumatic strut upon movement of a motor vehicle along a surface driven upon;

a pumping arrangement independent of said self-pumping and internally self-leveling arrangement;

said pumping arrangement being configured and disposed to supply pressure to said hydraulic damping fluid in said cylinder to adjust the position of said piston in said cylinder;

said pumping arrangement being actuated independently of said self-pumping and internally self-leveling arrangement; and a mechanism being configured and disposed to actuate said pumping arrangement upon a motor vehicle being in a standing position to permit said pumping arrangement to adjust the position of said piston in said cylinder and thus to permit self-leveling of a motor vehicle attached to said self-pumping shock absorbing strut.

2. The shock absorbing strut according to claim 1, wherein:

said self-pumping and internally self-leveling arrangement comprises a pump chamber;

said piston rod comprises a hollow portion disposed therein;

said hollow portion of said piston rod is configured and disposed to form said pump chamber;

said pump chamber is configured and disposed to contain said hydraulic damping fluid;

said self-pumping and internally self-leveling arrangement comprises a valve arrangement;

said valve arrangement is disposed within said piston;

said valve arrangement is configured and disposed to permit a flow of hydraulic damping fluid between said cylinder and said pump chamber; and said pumping arrangement is configured and disposed to supply pressure to said hydraulic damping fluid in said pump chamber and thus supply pressure to said hydraulic damping fluid in said cylinder by a flow of pressurized hydraulic damping fluid from said pump chamber through said valve arrangement to said cylinder.

3. The shock absorbing strut according to claim 2, wherein:

said shock absorbing strut comprises a tube;

said tube is disposed about said cylinder;

said tube comprises a first surface and a second surface;

said first surface of said tube is disposed adjacent to said cylinder;

said second surface of said tube is disposed opposite to said first surface of said tube; and said pumping arrangement is disposed to continuously compress and relax compression of hydraulic fluid in said cylinder through an end of said strut.

4. The shock absorbing strut according to claim 3, wherein:

said piston is configured and disposed in said cylinder to divide said cylinder into a first working chamber and a second working chamber;

said valve arrangement comprises a first valve and a second valve;

said first valve is configured and disposed to connect said first working chamber to said pump chamber;

said second valve is configured and disposed to connect said pump chamber to said second working chamber; and said pumping arrangement is configured and disposed to draw hydraulic damping fluid from said first working chamber through said first valve into said pump chamber and to transport hydraulic damping fluid from said pump chamber through said second valve to said second working chamber to supply pressure to said hydraulic fluid in said cylinder.

5. The shock absorbing strut according to claim 4, wherein said pumping arrangement comprises one of a piston-cylinder mechanism and an actuator mechanism.

6. The shock absorbing strut according to claim 5, wherein:
said pumping arrangement comprises said piston-cylinder mechanism;
said pumping arrangement is disposed adjacent to said second surface of said tube;
said pumping arrangement comprises a connecting arrangement; and
said connecting arrangement is configured and disposed to connect said piston-cylinder mechanism to said pump chamber.

7. The shock absorbing strut according to claim 6, wherein:
said piston is a first piston;
said piston-cylinder mechanism comprises a second piston;
said pumping arrangement comprises a parting element;
said hydraulic damping fluid in said pump chamber is disposed to contact one of said parting element and said second piston.

8. The shock absorbing strut according to claim 7, wherein:
said hydraulic damping fluid in said pump chamber is disposed to contact said parting element; and
said parting element comprises one of the following a), b) and c):
a) a diaphragm;
b) a parting piston; and
c) a step piston.

9. The shock absorbing strut according to claim 8, wherein:
said parting element is disposed within said piston rod;
said pumping arrangement comprises additional hydraulic fluid;
said additional hydraulic fluid is disposed to be compressed by said second piston of said piston-cylinder mechanism; and
said additional hydraulic fluid is disposed to move said parting element to supply pressure to said hydraulic damping fluid in said pump chamber upon said additional hydraulic fluid being compressed by said second piston.

10. The shock absorbing strut according to claim 9, wherein:
said connecting arrangement is a first connecting arrangement;
said pumping arrangement comprises a second connecting arrangement; and
said second connecting arrangement is configured to connect said piston-cylinder mechanism to a pump chamber of an additional self-pumping hydropneumatic shock absorbing strut with an internal level control.

11. The shock absorbing strut according to claim 10, wherein said pumping arrangement is configured to supply pressure to a pump chamber of an additional self-pumping hydropneumatic shock absorbing strut with an internal level control.

12. The shock absorbing strut according to claim 11, wherein:
said piston-cylinder mechanism comprises a third piston;
said third piston is configured and disposed to compress said additional hydraulic fluid to supply pressure to a pump chamber of an additional self-pumping hydropneumatic shock absorbing strut with an internal level control;
said piston-cylinder mechanism comprises an eccentric; and
said eccentric is configured and disposed to drive both said second piston and said third piston.

13. The shock absorbing strut according to claim 12, wherein:
said actuating mechanism comprise an electric motor;
said electric motor comprises a first shaft;
said eccentric comprises a second shaft;
said second shaft is connected to said first shaft;
said piston-cylinder mechanism comprises a seal;
said seal is configured and disposed to seal said second shaft and to prevent insertion of foreign elements into said piston-cylinder mechanism;
said shock absorbing strut comprises a chamber;
said chamber is disposed between said first surface of said tube and said cylinder;
said chamber comprises a first chamber and a second chamber;
said first chamber is disposed adjacent to said first working chamber;
said first chamber is configured to contain said hydraulic damping fluid;
said first chamber comprises a recess to connect said first chamber to said first working chamber;
said second chamber is disposed adjacent to said second working chamber;
said second chamber is operatively connected to said second working chamber;
said second chamber is configured to contain said hydraulic damping fluid;
said shock absorbing strut comprises at least one spring mechanism;
said at least one spring mechanism is disposed in said second chamber;
said at least one spring mechanism comprises a portion of said second chamber;
said portion of said second chamber is configured to contain a gas;
said self-pumping and internally self-leveling arrangement comprises a pump rod;
said pump rod is mounted on said first end of said cylinder;
said pump rod is configured and disposed to slide into said pump chamber;
said pump rod, said pump chamber and said valve arrangement are configured to together form a piston pump;
said piston pump is configured and disposed to be driven by said at least one spring mechanism;
said piston pump is configured and disposed to pump said hydraulic damping fluid from said first chamber to said second working chamber; and
said connecting arrangement comprises an apparatus to permit a filling and venting of said additional hydraulic fluid in said first connecting arrangement.

14. The shock absorbing strut according to claim 5, wherein:
said pumping arrangement comprises said actuator mechanism;
said pumping arrangement is disposed adjacent to said first surface of said tube;
said actuator is disposed within one of said first end of said cylinder and said piston rod; and
said actuator is integral with said one of said first end of said cylinder and said piston rod.

15. The shock absorbing strut according to claim 14, wherein:

said self-pumping and internally self-leveling arrangement comprises a pump rod;

said pump rod is mounted on said first end of said cylinder;

said pump rod is configured and disposed to slide into said pump chamber;

said pump rod comprises a hollow portion;

said actuator is disposed within said first end of said cylinder;

said actuator is integral with said first end of said cylinder; and said hollow portion of said pump rod is configured and disposed to form a connection for a flow of said hydraulic damping fluid between said actuator and said pump chamber.

16. The shock absorbing strut according to claim 15, wherein:

said pumping arrangement comprises a parting element; and said hydraulic damping fluid in said pump chamber is disposed to contact one of said parting element and said actuator.

17. The shock absorbing strut according to claim 16, wherein:

said hydraulic damping fluid in said pump chamber is disposed to contact said parting element;

said parting element comprises one of the following a), b) and c):
a) a diaphragm;
b) a parting piston; and
c) a step piston;

said shock absorbing strut comprises a chamber;

said chamber is disposed between said first surface of said tube and said cylinder;

said chamber comprises a first chamber and a second chamber;

said first chamber is disposed adjacent to said first working chamber;

said first chamber is configured to contain said hydraulic said first chamber comprises a recess to connect said first chamber to said first working chamber;

said second chamber is disposed adjacent to said second working chamber;

said second chamber is operatively connected to said second working chamber;

said second chamber is configured to contain said hydraulic damping fluid;

said shock absorbing strut comprises at least one spring mechanism;

said at least one spring mechanism is disposed in said second chamber;

said at least one spring mechanism comprises a portion of said second chamber;

said portion of said second chamber is configured to contain a gas;

said pump rod, said pump chamber and said valve arrangement are configured to together form a piston pump;

said piston pump is configured and disposed to be driven by said at least one spring mechanism;

said piston pump is configured and disposed to pump said hydraulic damping fluid from said first chamber to said second working chamber; and said actuating mechanism comprises an electric motor.

18. A self-pumping hydropneumatic shock absorbing strut with an internal level control for a motor vehicle, said shock absorbing strut comprising:

a cylinder;

said cylinder containing hydraulic damping fluid;

said cylinder comprising a first end and a second end;

said first end of said cylinder being configured and disposed to operatively connect to a first part of a motor vehicle;

said second end of said cylinder being disposed opposite said first end of said cylinder;

a piston rod;

said piston rod sealingly projecting into said second end of said cylinder;

said piston rod comprising a first end and a second end;

said first end of said piston rod being configured and disposed to operatively connect to a second part of a motor vehicle;

said second end of said piston rod being disposed opposite said first end of said piston rod;

a piston;

said piston being disposed on said second end of said piston rod;

said piston being configured and disposed to slide within said cylinder;

a self-pumping arrangement and an internally self-leveling arrangement being configured and disposed to move said piston to a position to self-level a motor vehicle attached to said self-pumping hydropneumatic strut upon movement of a motor vehicle along a surface driven upon;

a pumping arrangement independent of said self-pumping arrangement and said internally self-leveling arrangement;

said independent pumping arrangement being configured and disposed to continuously compress and relax compression of hydraulic damping fluid in said cylinder; and a mechanism being configured and disposed to actuate and deactuate said independent pumping arrangement to permit said independent pumping arrangement to continuously compress and relax compression of hydraulic damping fluid in said cylinder and to thus actuate said internally self-leveling arrangement to self-level a motor vehicle in a standing position.

19. The shock absorbing strut according to claim 18, wherein:

said pumping arrangement comprises a reciprocating piston; and said reciprocating piston is configured and disposed to continuously and repeatedly compress and relax compression of hydraulic damping fluid in said cylinder upon actuation of said pumping arrangement.

20. The shock absorbing strut according to claim 19, further comprising:

a sole hydraulic connection between said pumping arrangement and said cylinder; and said sole hydraulic connection being configured and disposed to connect said pumping arrangement and said cylinder to conduct the continuous compression and relaxation of compression of hydraulic damping fluid in said cylinder.

* * * * *

UNITED STATES PATENT AND TRADEMARK OFFICE
CERTIFICATE OF CORRECTION

PATENT NO.   : 5,988,607
DATED        : November 23, 1999
INVENTOR(S)  : Hubert BECK It is certified that error appears in the above-identified patent and that said Letters Patent is hereby corrected as shown below:

In column 13, line 42, Claim 17, after 'hydraulic' insert --damping fluid;--.

Signed and Sealed this

Seventh Day of November, 2000

Attest:

Q. TODD DICKINSON

*Attesting Officer*            Director of Patents and Trademarks